United States Patent

Westly et al.

[11] Patent Number: 4,512,505
[45] Date of Patent: Apr. 23, 1985

[54] CONVERTIBLE PLATEN FOR GRAPHICS PLOTTER

[75] Inventors: Pernie E. Westly, Huntington Beach; Uri Leder, Cerritos, both of Calif.

[73] Assignee: Sanders Associates, Inc., Nashua, N.H.

[21] Appl. No.: 631,289

[22] Filed: Jul. 16, 1984

[51] Int. Cl.³ .................. B65H 23/00; B65H 23/04
[52] U.S. Cl. .................. 226/101; 226/181; 226/196; 242/183; 346/136; 400/578
[58] Field of Search .................. 400/18, 19, 29, 648, 400/649, 578; 346/136, 145; 226/95, 97, 118, 119, 101, 181, 196; 242/182–185

[56] References Cited

U.S. PATENT DOCUMENTS 3,643,889  2/1972  Krause ........................ 226/95 X
4,158,846  6/1979  Gordon ........................ 346/136

Primary Examiner—Clifford D. Crowder
Attorney, Agent, or Firm—Louis Etlinger; William F. Porter, Jr.

[57] ABSTRACT

A convertible platen for use in a graphics plotter to allow its selective use as either a cut paper plotter or a roll paper plotter. The platen is formed from a specially designed aluminum extrusion and a pair is mounted with one on either side of the drum of a drum plotter between the drum and the supply/takeup rollers. The platens can be raised and held adjacent the drum and spanning the vacuum columns in the plotter to create a table having curved outer edges to support cut paper. They can be released and dropped into the vacuum columns whereby they lie against the outer surfaces and form the upper inner wall with curved upper edges over which paper smoothly is guided between the vacuum columns and the supply/takeup rollers.

2 Claims, 7 Drawing Figures

CONVERTIBLE PLATEN FOR GRAPHICS PLOTTER

BACKGROUND OF THE INVENTION

The present invention relates to graphics plotters and, more particularly, to a convertible platen for use in a drum plotter having vacuum columns and supply/-takeup rollers wherein two platens are disposed with one on either side of the drum and with each being movable between a raised position spanning the vacuum column to create a table for cut paper movement and a lowered position allowing access to the vacuum column and forming a curved upper surface over which the roll paper smoothly flows to and from the roller.

In a drum type graphics plotter, a strip of paper (or other writing medium) is typically moved across the drum bi-directionally by being held against the surface of the drum at a rolling point of contact by a pinch roller while the drum is driven in response to a signal. Simultaneously, a writing head is moved traversely across the drum carrying a pen or other writing device in contact with the paper surface. The plot to be created in the X and Y directions is accomplished as a result of the bi-directional longitudinal movement of the paper in combination with the traverse movement back and forth of the head across the paper.

Typically, two types of paper are used—roll and cut. With roll paper, the paper extends from a supply/-takeup roller across the drum to a second supply/-takeup roller. To isolate the paper roll high inertia from the drum drive, so as to keep drum drive inertia low, and help facilitate quick start/stop moves, a vacuum column is disposed between each of the supply/takeup rollers and the drum in much the same manner as vacuum columns are employed in magnetic tape drives used with computer systems. For cut paper, on the other hand, a table is provided extending outwardly from the drum in either direction. The table supports the paper, which is of cut or fixed length, as it moves back and forth across the surface of the drum. The size of the table horizontally and the height of the surface of the drum from the floor determine the total length of the cut paper that can be employed. Typically, a drum graphics plotter is adapted to employ roll paper or cut paper, but not both.

Wherefore, it is the object of the present invention to provide apparatus for incorporation into a drum graphics plotter which will allow the combined ability to use either roll paper or cut paper effectively.

SUMMARY

The foregoing objective has been accomplished in a graphics plotter having a drum disposed and in parallel spaced relationship with a pair of paper holding rollers and including a pair of paper loop vacuum columns disposed with respective rectangular openings between respective ones of the rollers and the drum and parallel thereto by the improvement of the present invention comprising a pair of convertible platen members disposed adjacent respective ones of the openings to the vacuum column, the members having an inner edge adapted to fit close adjacent the drum and an arcuate outer edge, the members being mounted for movement between a raised cut paper position with the inner edges adjacent the drum and the members between the inner and outer edges spanning across the openings and a lowered roll paper position lying adjacent the top of the inside of the outer wall of the vacuum columns whereby the outer edges form curved surfaces at the top outer edges of the vacuum columns over which roll paper can smoothly slide between the vacuum columns and the paper holding rollers when the members are in the lowered position and form a table on either side of the drum with curved outer edges over which cut paper can smoothly slide back and forth when in the raised position; and, support means for releasably holding the members in the aforesaid positions.

DESCRIPTION OF THE PREFERRED EMBODIMENT

Figure 1:
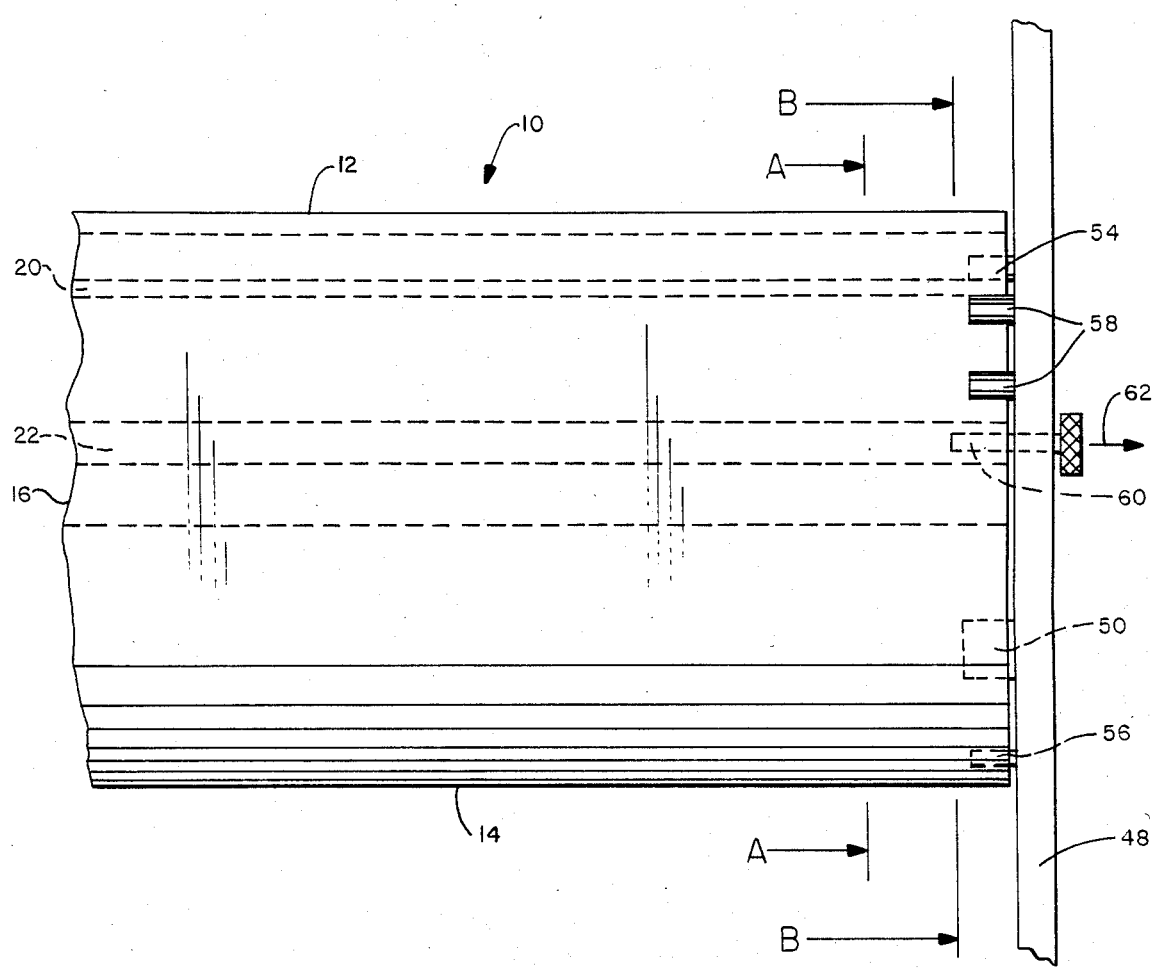
FIG. 1 is a plan view of one end of the convertible platen of the present invention.
Figure 2:
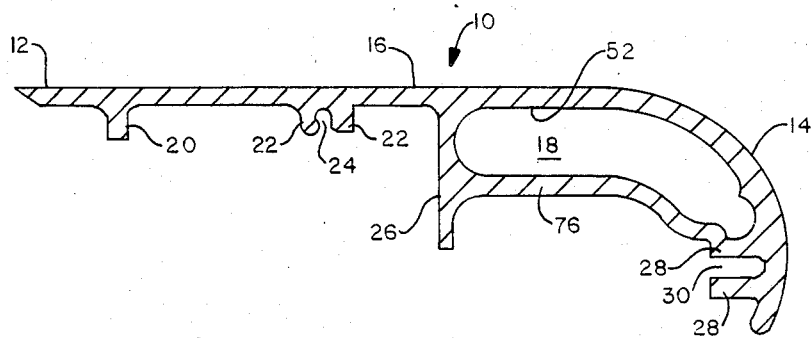
FIG. 2 is a cutaway section of the basic extrusion forming the platen of the present invention in the plane A—A of FIG. 1.

The heart of the present invention is the convertible platen generally indicated as 10 in FIGS. 1 and 2. The platen 10 is cut from an aluminum extrusion generally configured as shown in cross section in FIG. 2. While those skilled in the art will recognize that certain modifications can be made within the scope and spirit of the present invention, the extrusion forming the platen 10 has certain characteristic parts. At 12 is a straight inner edge adapted to fit close adjacent the drum of a plotter as will be described in greater detail shortly. At 14 is an outer edge of broad, arcuate shape parallel to the edge 12 and designed to perform certain functions as will also be described in greater detail shortly. Extending between the inner edge 12 and outer edge 14 is a flat plate portion 16. Adjacent the outer edge 14 is a curved slot 18 by which it will be seen that the platen 10 is mounted to a plotter for movement between the two positions which permit the plotter to be converted between cut paper operation and roll paper operation. Also formed into the extrusion from which the platen 10 is made are a longitudinal rib 20, a pair of close adjacent ribs 22 defining a slot 24, a surface 26 normal to the flat plate portion 16, and close adjacent longitudinal ribs 28 defining another slot 30.

Figure 3:
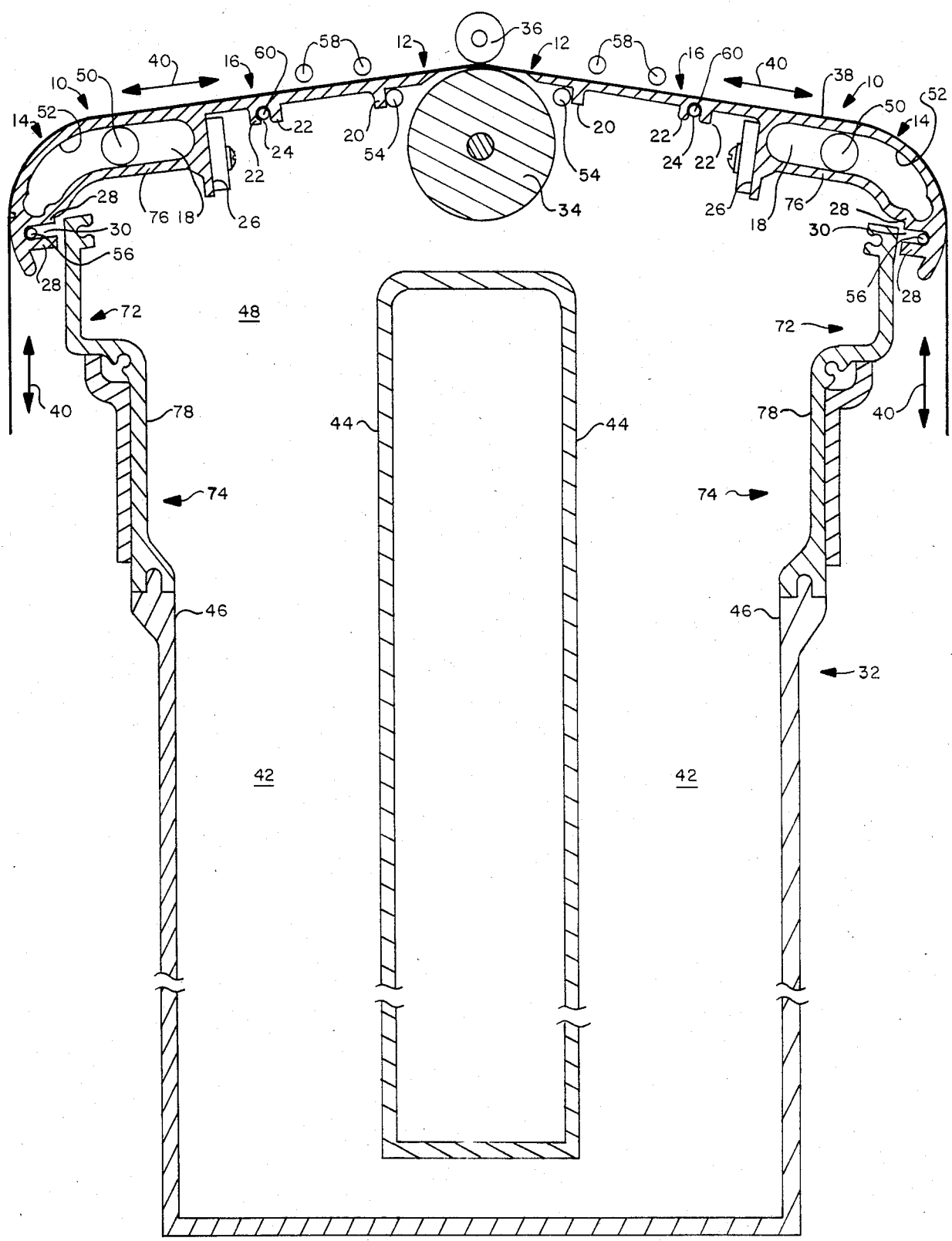
FIG. 3 is a cutaway elevation of a graphics plotter employing the present invention with the platens in their raised or cut paper position.

As can best be seen with combined reference to FIGS. 1 and 3, portions of a plotter 32 according to the present invention include a drum 34 adapted for clockwise and counterclockwise rotation against which a pair of pinch rollers 36 are positioned adjacent the ends of the drum 34 so as to hold a strip of paper 38 (or other medium) in rotational contact with the surface of the drum 34 for longitudinal movement as indicated by the arrows 40 when the drum 34 is rotated. A manifold pair of vacuum columns 42 are positioned with one on either side of the drum 34. The vacuum columns 42 are of rectangular cross section having inner walls 44 and outer walls 46 parallel to the drum 34. The drum 34 is journal-mounted between and normal to two parallel side plates 48. A pair of platens 10 according to the present invention are also mounted normal to the side plates 48. The principal mounting of the platens 10 is by means of a cylindrical projection 50 on each of the side plates 48. The projections 50 are concentrically aligned and disposed within the curved slot 18.

Figure 7:
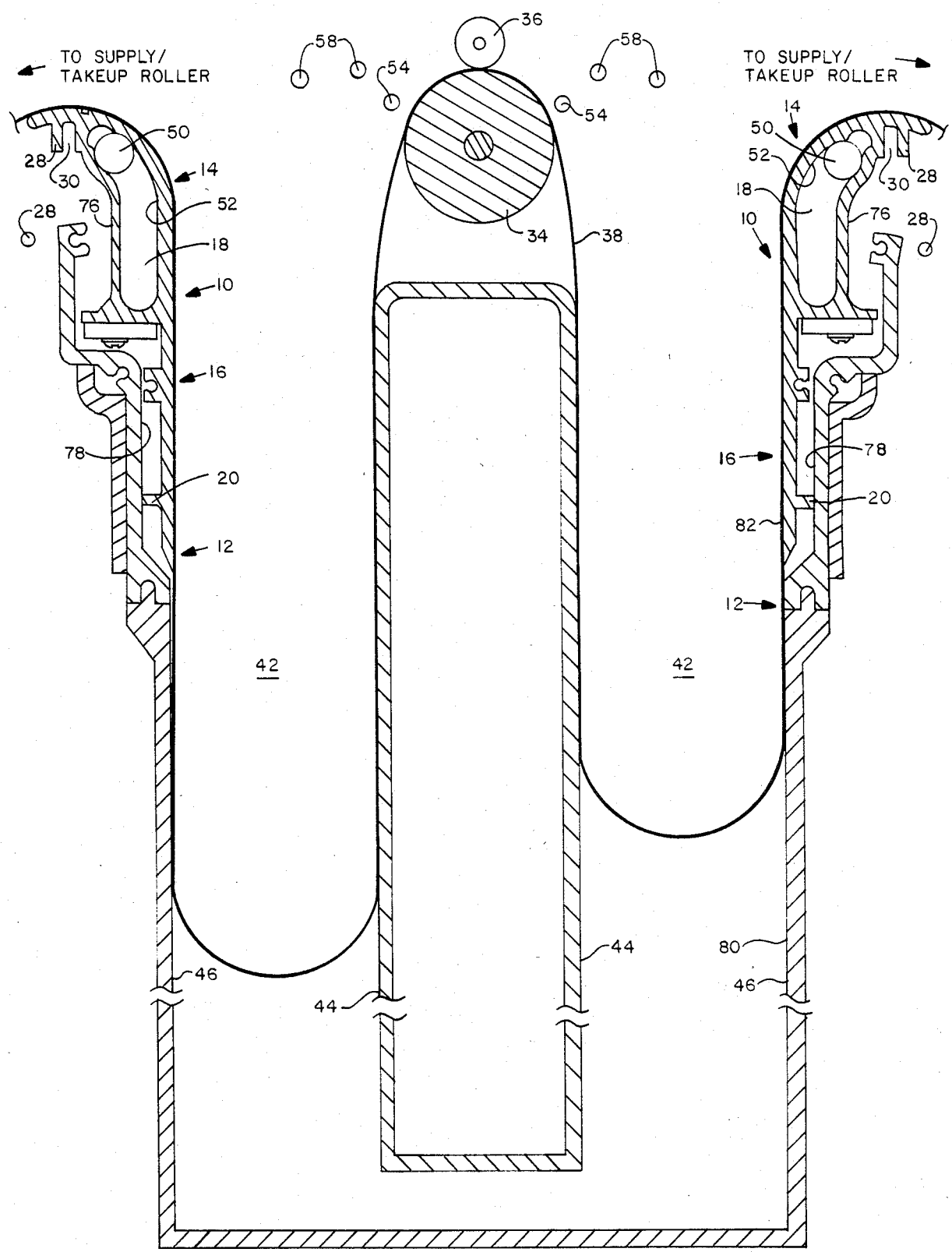
FIG. 7 shows the plotter of FIG. 3 with the platens in their fully lowered or roll paper position.

The convertible platens 10 as incorporated within the plotter 32 are movable between the raised position of FIG. 3 wherein they serve as a table to support cut paper and the position of FIG. 7 where they are lowered to form a portion of the outer walls 46 of the vacuum columns 42 and a curved upper surface for the outer edge of the vacuum columns 42 over which roll paper can move smoothly from and to the supply/-takeup rollers. The projections 50 in combination with the curved slots 18 and certain other mounting members to be described permit this operation.

Turning once again with particularity to FIGS. 1 and 3, the convertible platens 10 are shown in their raised or cut paper position where they are releasably held. (It should be understood by those skilled in the art that as the figures herein are viewed, the various mounting members to be described are shown with respect to one of the parallel side plates 48 and that there is a corresponding member on the other parallel side plate 48 in concentric alignment therewith.) Each of the platens 10 is supported in its raised position by the top of the cylindrical projection 50 bearing against the top inner surface 52 of the curved slot 18. Additionally, a projection 54 supports the inner edge 12 adjacent the drum 34. The projections 54 serve a second purpose in that the longitudinal ribs 20 abut against them and are so positioned such that the inner edge 12 is placed close adjacent the drum 34 and the paper 38 is put in alignment to pass smoothly between the drum 34 and pinch rollers 36. As can be seen, as thus positioned, the convertible platens 10 form a table to support cut paper and have broadly curved outer edges at the outer edges 14 over which the cut paper can smoothly pass without folding or creasing so as to freely move in the direction of the arrows 40 during operation.

Additionally, to guide and support the platens 10, projections 56 are provided to match with slots 30 and projections 58 are provided above the inner edge 12. The purpose and positioning of the projections 58 will be seen in greater detail as the movement of the platens 10 is described. Finally, releasable pins 60 are provided for engagement into the slots 24. With the pins 60 engaged in the slots 24, it can be seen that the various members hereinbefore described combine to hold the platens 10 in their raised or cut paper position as shown in FIG. 3.

Figure 4:
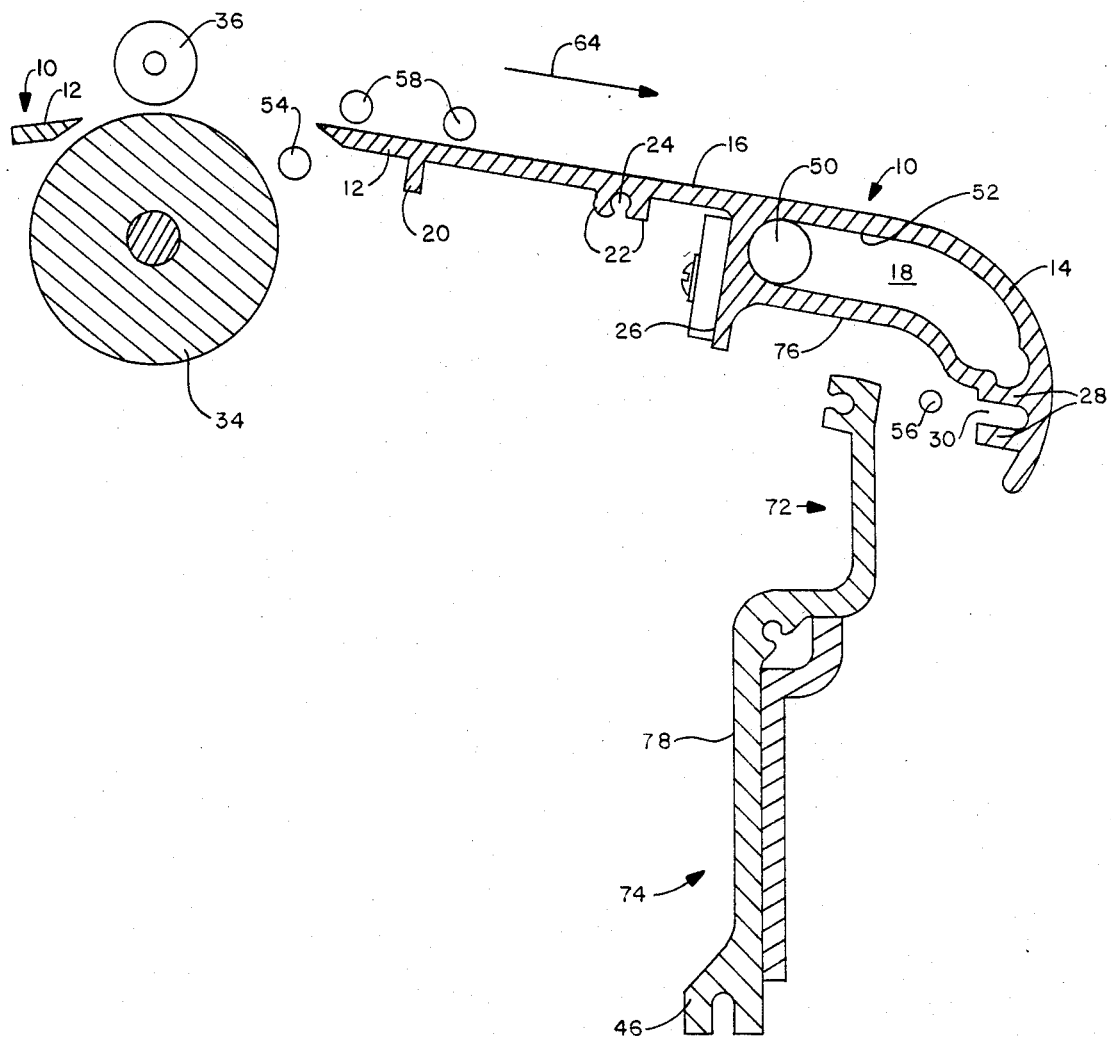
FIG. 4 is a cutaway enlarged view of the platen of FIG. 3 at the plane B—B of FIG. 1 shown retracted prior to being rotated to the lowered position.
Figure 5:
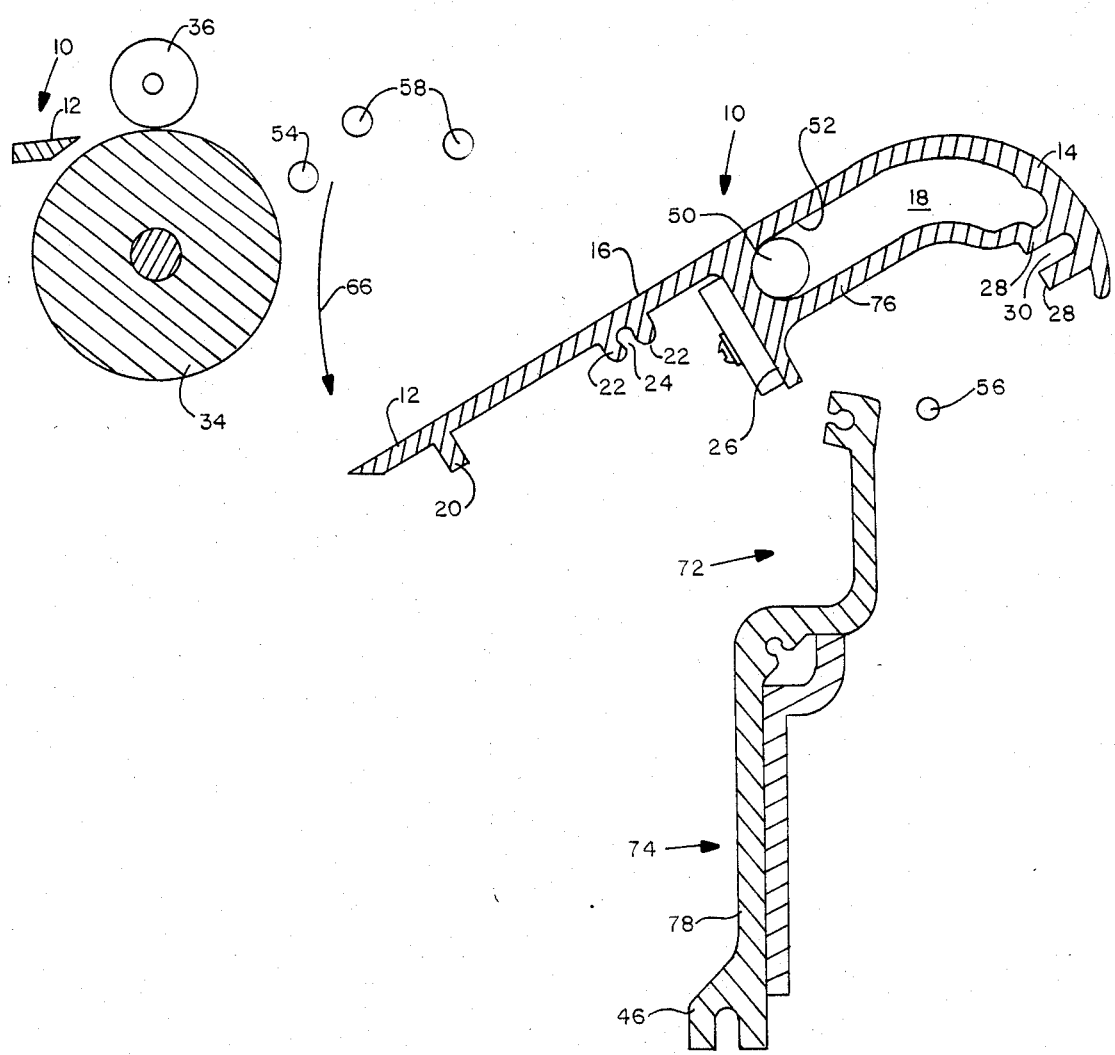
FIG. 5 shows the platen of FIG. 4 being rotated towards the lowered position.
Figure 6:
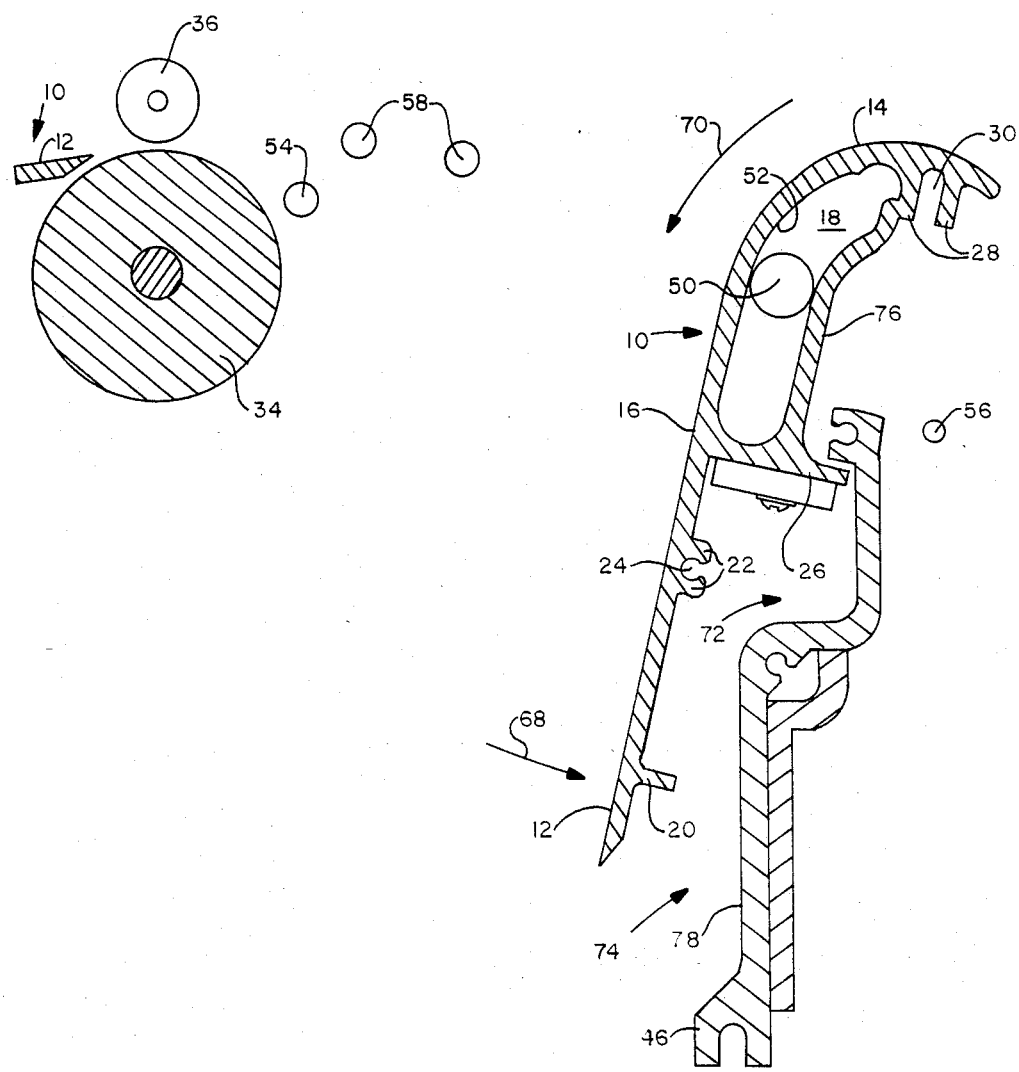
FIG. 6 shows the platen of FIG. 5 further rotated towards the lowered position.

The conversion from cut paper operation to roll paper operation is shown in sequence in FIGS. 4-6. The releasable pins 60 are first pulled out in the direction of arrows 62 (see FIG. 1) to release them from the slots 24 and thus allow outward movement of the platens 10 in the direction of arrows 64. Each platen 10 is first fully withdrawn until the projection 50 is at the extreme inner end of the slot 18. This also causes the supporting projection 56 to be withdrawn from the slot 30. As shown in FIG. 5, the platen 10 can then be rotated about the projection 50 in the direction of arrows 66 clearing the support projections 54 and 56 in the process. As shown in FIG. 6, the platen 10 is further rotated about the projection 50 in the direction of arrows 68 while, simultaneously, it is moved downward along the projection 50 in the direction of arrow 70. This combined rotating and sliding motion is continued until the platen 10 achieves its full downward position as shown in FIG. 7 wherein the plotter 32 is set up to use roll paper. Note that the upper portion of the outer walls 46 of the vacuum columns 42 is jogged outward into steps at 72 and 74, respectively, to provide space into which the surface 26, inner walls 76 of slot 18, rib 20, and ribs 22 can fit. Note that as thus positioned, the rib 20 serves a further purpose in that it abuts the wall 78 of step 72 such that the surface 80 of the flat plate portion 16 of platen 10 is in the same plane as the surface 82 of outer wall 46. Moreover, the arcuate shape of the curved outer edge 14 forms a broad, smooth, curved upper edge to the outer wall 46 of the vacuum columns 42 such that paper 38 extending between a pair of supply/-takeup rollers (not shown, being out of view to the left and right of FIG. 7 as it is viewed) can move smoothly out of the vacuum columns 42 and to the supply/takeup rollers.

Wherefore, having thus described our invention, we claim:

1. In a graphics plotter having a drum disposed between and in parallel spaced relationship with a pair of paper holding rollers and including a pair of paper loop vacuum columns disposed with respective rectangular openings between respective ones of the rollers and the drum and parallel thereto, the improvement to permit operation of the plotter as either a roll paper plotter or a cut paper plotter comprising:

(a) a pair of convertible platen members disposed adjacent respective ones of the openings to the vacuum column, said members having an inner edge adapted to fit close adjacent the drum and an arcuate outer edge, said members being mounted for movement between a raised cut paper position with said inner edges adjacent a drum and said members between said inner and outer edges spanning across the openings and a lowered roll paper position lying adjacent the top of the inside of the outer wall of the vacuum columns whereby said outer edges form curved surfaces at the top outer edges of the vacuum columns over which roll paper can smoothly slide between the vacuum columns and the paper holding rollers when said members are in said lowered position and form a table on either side of the drum with curved outer edges over which cut paper can smoothly slide back and forth when in said raised position; and, (b) support means for releasably holding said members in said position.

2. The improvement of claim 1 wherein:
the upper portion of the outer walls of the vacuum columns are shaped to receive said platen members whereby when said platen members are in said lowered position the surface thereof facing into the vacuum columns lies in a common plane with the lower portion of the outer walls of the vacuum columns.

* * * * *